US012654204B2

(12) United States Patent
Zhao

(10) Patent No.: US 12,654,204 B2
(45) Date of Patent: Jun. 16, 2026

(54) CLEANING DEVICE

(71) Applicant: Greenworks (Jiangsu) Co., Ltd., Changzhou (CN)

(72) Inventor: Chunlin Zhao, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 205 days.

(21) Appl. No.: 18/412,622

(22) Filed: Jan. 15, 2024

(65) Prior Publication Data

US 2024/0149307 A1 May 9, 2024

Related U.S. Application Data

(63) Continuation of application No. PCT/CN2022/106153, filed on Jul. 18, 2022.

(30) Foreign Application Priority Data

Jul. 30, 2021 (CN) .......................... 202110868474.8
Jul. 30, 2021 (CN) .......................... 202110868645.7
(Continued)

(51) Int. Cl.
*B08B 1/40* (2024.01)
*A47L 11/34* (2006.01)
(Continued)

(52) U.S. Cl.
CPC .................. *B08B 1/40* (2024.01); *B08B 7/04* (2013.01); *A47L 11/34* (2013.01); *A47L 11/4083* (2013.01);
(Continued)

(58) Field of Classification Search
CPC ..... B08B 1/40; B08B 7/04; B08B 2203/0205; B08B 2203/0223; B08B 3/026;
(Continued)

(56) References Cited

U.S. PATENT DOCUMENTS 6,189,811 B1 * 2/2001 Rudy .................... F04B 17/006
239/525
9,316,216 B1 4/2016 Cook et al.
(Continued)

FOREIGN PATENT DOCUMENTS

CN 101776077 A 7/2010
CN 201838666 U 5/2011
(Continued)

OTHER PUBLICATIONS

CN111933858 translation (Year: 2020).*
CN211247027 translation (Year: 2020).*
DE102017206500 translation (Year: 2018).*

*Primary Examiner* — Michael E Barr
*Assistant Examiner* — Lauren G Orta

(57) ABSTRACT

The present disclosure discloses a cleaning device, including a frame and a multi-channel adapter, where a water tank, a water pump, and a motor pump assembly are mounted on the frame; and the multi-channel adapter is provided with a water inlet and a water outlet. The water inlet includes a first water inlet, a second water inlet, and a third water inlet. A water outlet joint of the water tank is connected to the first water inlet. The water pump is connected to the second water inlet, and the motor pump assembly is connected to the third water inlet and the water outlet. According to the present disclosure, a battery life and a cleaning effect of the cleaning device are improved, a requirement for an outdoor cleaning operation can be met, and convenience of water fetching is improved, thereby enhancing work experience of a user.

19 Claims, 12 Drawing Sheets

(30)         Foreign Application Priority Data

| Jul. 30, 2021 | (CN) | 202110879751.5 |
| Jul. 30, 2021 | (CN) | 202121757727.6 |
| Jul. 30, 2021 | (CN) | 202121757730.8 |
| Jul. 30, 2021 | (CN) | 202121770809.4 |
| Jul. 30, 2021 | (CN) | 202121770856.9 |
| Jul. 30, 2021 | (CN) | 202121772739.6 |

(51) Int. Cl.

| *A47L 11/40* | (2006.01) |
| *B08B 3/02* | (2006.01) |
| *B08B 7/04* | (2006.01) |
| *F04B 17/03* | (2006.01) |
| *F04B 17/06* | (2006.01) |
| *F04B 41/02* | (2006.01) |
| *H01M 50/244* | (2021.01) |
| *H01M 50/247* | (2021.01) |
| *H02J 7/60* | (2026.01) |

(52) U.S. Cl.
CPC ............. *A47L 11/4088* (2013.01); *B08B 3/02* (2013.01); *B08B 3/026* (2013.01); *B08B 2203/0205* (2013.01); *B08B 2203/0223* (2013.01); *F04B 17/03* (2013.01); *F04B 17/06* (2013.01); *F04B 41/02* (2013.01); *H01M 50/244* (2021.01); *H01M 50/247* (2021.01); *H01M 2220/30* (2013.01); *H02J 7/667* (2026.01)

(58) Field of Classification Search
CPC ........ B08B 3/02; A47L 11/34; A47L 11/4083; A47L 11/4088; H01M 50/247; H01M 2220/30; H01M 50/244; F04B 41/02; F04B 17/03; F04B 17/06; H02J 7/0032
See application file for complete search history.

(56)         References Cited

U.S. PATENT DOCUMENTS

| 2005/0145270 | A1* | 7/2005 | Ray | B05B 1/30 |
| | | | | 134/174 |
| 2010/0192980 | A1* | 8/2010 | Turner | A47L 11/4083 |
| | | | | 15/328 |
| 2015/0174598 | A1 | 6/2015 | Eschrich | |
| 2017/0304873 | A1* | 10/2017 | Luby | B08B 3/026 |
| 2018/0221899 | A1* | 8/2018 | Steffen | B05B 7/1693 |
| 2019/0084677 | A1 | 3/2019 | Vanhaelst | |
| 2019/0283061 | A1* | 9/2019 | Qiao | B08B 3/02 |
| 2019/0388918 | A1* | 12/2019 | Gustafson | B05B 9/0861 |
| 2019/0388923 | A1* | 12/2019 | Giacalone | B05B 12/00 |
| 2020/0288654 | A1* | 9/2020 | Mohr | B60L 50/66 |

FOREIGN PATENT DOCUMENTS

| CN | 202338774 | U | | 7/2012 | |
| CN | 203380035 | U | | 1/2014 | |
| CN | 203750901 | U | | 8/2014 | |
| CN | 104114863 | A | | 10/2014 | |
| CN | 204320708 | U | | 5/2015 | |
| CN | 105324188 | A | | 2/2016 | |
| CN | 205344845 | U | | 6/2016 | |
| CN | 107051939 | A | | 8/2017 | |
| CN | 107486426 | A | | 12/2017 | |
| CN | 207887571 | U | | 9/2018 | |
| CN | 208357329 | U | | 1/2019 | |
| CN | 109570098 | A | | 4/2019 | |
| CN | 208884616 | U | | 5/2019 | |
| CN | 209255352 | U | | 8/2019 | |
| CN | 209613652 | U | | 11/2019 | |
| CN | 110848835 | A | | 2/2020 | |
| CN | 110860405 | A | | 3/2020 | |
| CN | 111318499 | A | | 6/2020 | |
| CN | 210788332 | U | | 6/2020 | |
| CN | 211247027 | U | * | 8/2020 | B05B 15/65 |
| CN | 111933858 | A | * | 11/2020 | B25F 5/00 |
| CN | 213468782 | U | | 6/2021 | |
| CN | 113546903 | A | | 10/2021 | |
| CN | 113560257 | A | | 10/2021 | |
| CN | 216297258 | U | | 4/2022 | |
| CN | 216323629 | U | | 4/2022 | |
| CN | 216324044 | U | | 4/2022 | |
| DE | 102017206500 | A1 | * | 10/2018 | B08B 3/00 |
| EP | 2881592 | B1 | | 10/2016 | |
| EP | 3419769 | B1 | * | 11/2024 | B08B 3/026 |

* cited by examiner

Description of external wiring

3→L          1→N
7→M+      5→M-
15→DC+   13→
DC-

CLEANING DEVICE

CROSS REFERENCE TO RELATED APPLICATION

The present application is a continuation application of PCT Application No. PCT/CN2022/106153, filed on Jul. 18, 2022, which claims the benefit of priority to a Chinese Patent Application number CN 202110868645.7, filed on Jul. 30, 2021, a Chinese Patent Application number CN 202110868474.8, filed on Jul. 30, 2021, a Chinese Patent Application number CN 202121757730.8, filed on Jul. 30, 2021, a Chinese Patent Application number CN 202121757727.6, filed on Jul. 30, 2021, a Chinese Patent Application number CN 202121772739.6, filed on Jul. 30, 2021, a Chinese Patent Application number CN 202121770856.9, filed on Jul. 30, 2021, a Chinese Patent Application number CN 202121770809.4, filed on Jul. 30, 2021, and a Chinese Patent Application number CN 202110879751.5, filed on Jul. 30, 2021, the disclosure of the above applications is hereby incorporated by reference in their entireties for all purposes.

TECHNICAL FIELD

The present disclosure relates to the technical field of cleaning devices, and in particular, to a cleaning device.

BACKGROUND

Conventional alternating current/direct current dual-purpose cleaning devices generally use a low-voltage battery. Since the battery has a low voltage and a small capacity, power of the cleaning device is quite small during operation in direct current, and is only about less than a half of that during operation in alternating current. The cleaning device has a very small outlet water pressure, a very short battery life, and a very poor cleaning effect, which cannot meet a requirement for an outdoor cleaning operation.

Existing alternating current/direct current cleaning devices in the market all achieve water inflow through one channel, with a top water tank attached. Water enters, from a bottom of the water tank, a water inlet joint connected to the water tank to enter the cleaning device. When the water in the water tank is used up, the water tank is used to fetch water and is placed on the cleaning device to continue to be used. Due to the consideration of ease of carrying, the water tank has a small volume, so that water has short endurance during use. During use of an external tap water source, the water tank is first removed, and is externally connected to a water pipe joint and then connected to the external water source for operation, which is very inconvenient to operate, resulting in quite poor experience.

An external water tank of the direct current cleaning device in the market has a small capacity, but water consumption is fast when the cleaning device operates, so that there is a need to fetch water frequently, which is time-consuming and laborious, and it is quite inconvenient to fetch water, resulting in poor work experience.

SUMMARY

To solve the above technical problems, the present disclosure provides a cleaning device to solve the problems that a cleaning device has a very small outlet water pressure, very short duration, and a very poor cleaning effect, which cannot meet a requirement for outdoor cleaning operation;

water consumption is fast when the cleaning device operates, so that there is a need to fetch water frequently, which is time-consuming and laborious, and it is quite inconvenient to fetch water, resulting in poor work experience.

The present disclosure provides a cleaning device, including a frame and a multi-channel adapter. A water tank, a water pump and a motor pump assembly are mounted on the frame. The multi-channel adapter is provided with a water inlet and a water outlet, where the water inlet includes a first water inlet, a second water inlet, and a third water inlet; a water outlet joint of the water tank is connected to the first water inlet; a water outlet of the water pump is connected to the second water inlet, and a water inlet of the motor pump assembly is connected to the water outlet of the multi-channel adapter.

In an embodiment of the present disclosure, a cleaning agent suction pot assembly is further mounted on the frame, a liquid suction joint is arranged at a water outlet of the motor pump assembly, and the cleaning agent suction pot assembly is connected to the liquid suction joint through a pipeline; and the water pump is located between the water tank and the cleaning agent suction pot assembly.

In an embodiment of the present disclosure, the first water inlet is connected to the water outlet joint of the water tank through a pipeline, and a first water filtering apparatus is arranged at one end of the pipeline connected to the water outlet joint of the water tank.

In an embodiment of the present disclosure, a tank body of the water tank is further provided with a water filling port, the water filling port is provided at a top of the tank body, a water tank cover is mounted on the water filling port, and the water outlet joint is arranged on a side of the tank body and is close to a bottom of the tank body.

In an embodiment of the present disclosure, the motor pump assembly includes a brushless motor and a three-plunger high-pressure pump, where the brushless motor is connected to the three-plunger high-pressure pump, and the water outlet of the multi-channel adapter is connected to a water inlet of the three-plunger high-pressure pump.

In an embodiment of the present disclosure, the water pump is connected to an external water source through a water inlet pipe, and a second water filtering apparatus is arranged at an end of the water inlet pipe connected to the external water source.

In an embodiment of the present disclosure, a first check valve is arranged at the first water inlet, a second check valve is arranged at the second water inlet, and an opening pressure value of the second check valve is greater than that of the first check valve.

In an embodiment of the present disclosure, an exhaust valve is further arranged at the second water inlet, and the exhaust valve is arranged between an end of the second water inlet and the second check valve.

In an embodiment of the present disclosure, a third check valve is arranged at the third water inlet, the third water inlet is connected to tap water, a third water filtering apparatus is arranged at an end of the third water inlet connected to the tap water, and an opening pressure value of the third check valve is greater than that of the second check valve.

In an embodiment of the present disclosure, the frame includes a handle frame and a supporting frame, where the handle frame is fixedly connected to a side of the supporting frame, wheels are mounted at a bottom of the supporting frame, the wheels are located on a first side of the supporting frame on which the handle frame is mounted, and supporting legs are mounted on a second side of the supporting frame.

In an embodiment of the present disclosure, the frame further includes a winding frame, and the winding frame is mounted on a side of the supporting frame on which the handle frame is mounted; a power cable is mounted on the winding frame, and the power cable is configured to connect an external power source to provide alternating current power for the motor pump assembly.

In an embodiment of the present disclosure, the cleaning device further includes a plurality of battery packs, where the battery packs are detachably connected to the cleaning device.

In an embodiment of the present disclosure, the cleaning device further includes: an alternating current/direct current control module. The alternating current/direct current control module is mounted on the frame, and the alternating current/direct current control module includes an alternating current/direct current power transfer switch and a controller; the alternating current/direct current power transfer switch is electrically connected to a battery pack assembly and an external power source, where the battery pack assembly provides direct current power, the external power source provides alternating current power, and the alternating current/direct current power transfer switch is configured to control and switch between the alternating current power and the direct current power; and the controller is configured to protect a circuit, and a supply voltage provided by the battery packs and the external power source by using the controller is consistent with an optimal operating voltage of the motor pump assembly.

In an embodiment of the present disclosure, a motor in the motor pump assembly is a series-excited motor, and the motor can operate under a direct current power source and an alternating current power source.

In an embodiment of the present disclosure, the cleaning device further includes a battery pack assembly, where the battery pack assembly is mounted on the frame, and the motor pump assembly can provide direct current power by using the battery pack assembly; and where the battery pack assembly includes at least two detachable battery packs, and a supply voltage of a plurality of detachable battery packs is converted into an optimal operating voltage of the motor pump assembly by series and/or parallel connection between the plurality of the detachable battery packs.

In an embodiment of the present disclosure, at least two battery packs of the battery packs are further connected in series to form one group, and then all groups of battery packs are connected in parallel, so as to convert the supply voltage into the optimal operating voltage of the motor pump assembly.

In an embodiment of the present disclosure, the cleaning device further includes a power interface and an alternating current/direct current control module, where the power interface is externally connected to a power source by a power cable to provide alternating current power; and the alternating current/direct current control module is configured to switch between the alternating current power provided by the external power source and the direct current power provided by the battery pack assembly.

In an embodiment of the present disclosure, the battery pack assembly includes a battery pack mounting box, and a plurality of battery pack accommodating cavities are provided in the battery pack mounting box to accommodate and mount a plurality of battery packs.

In an embodiment of the present disclosure, the plurality of the battery pack accommodating cavities are distributed in a straight line, a rectangle shape, or a triangle shape in the battery pack mounting box.

In an embodiment of the present disclosure, a battery pack limiting mechanism is arranged on a side of a top of the battery pack accommodating cavity; the battery pack limiting mechanism includes a mounting base, a limiting member, and a spring member, where the mounting base is mounted on a side of the top of the battery pack accommodating cavity, the limiting member is rotatably connected to the mounting base by a rotating shaft, and the spring member is sleeved on the rotating shaft and is located between the limiting member and the rotating shaft.

In an embodiment of the present disclosure, a spring and a terminal insert are mounted at a bottom of the battery pack accommodating cavity; when the battery pack is inserted into the battery pack accommodating cavity, the spring is compressed, the terminal insert is connected to a terminal interface on the battery pack, and the battery pack is fixedly mounted under cooperation of the battery pack limiting mechanism and a limiting structure on the battery pack.

In an embodiment of the present disclosure, the water tank has a volume between 15 L and 50 L.

According to the present disclosure, the water pump is designed on the cleaning device. The water pump is configured to pump water in rivers, ponds, and pools into the fixed water tank through an attached pipeline when it is inconvenient to fetch water from an outdoor water source, so that the cleaning device can continuously supply water to the water tank. Due to this design, a user does not need a process of removing the water tank to fetch water from a source, which greatly improves user experience. Moreover, the water outlet of the water pump may be connected to the water inlet of the cleaning device through a pipeline to directly supply water to the cleaning device. To solve the gas exhaust problem of a water pipe, the exhaust valve apparatus is further designed between the water pump and the water inlet of the cleaning device, and can exhaust the air in a water pumping pipeline. In addition, the water pump forms an initial water pressure during water pumping, so that water in a river or pond can directly enter the high-pressure water pump more quickly. This design has better integration and achieves better use experience.

According to the present disclosure, the multi-channel adapter is arranged, each water source channel of the water inlet multi-channel adapter is provided with one check valve, and each check valve has a different pressure value, so that a corresponding water inlet valve can be effectively opened or closed to maintain normal use of a water channel, and thus the water inflow of the apparatus can be automatically completed.

BRIEF DESCRIPTION OF DRAWINGS

To describe the technical solutions in embodiments of the present disclosure more clearly, accompanying drawings required for describing the embodiments are briefly described below. Obviously, the accompanying drawings in the following description show merely some embodiments of the present disclosure, and a person of ordinary skill in the art can further derive other accompanying drawings from these accompanying drawings without creative efforts.

DESCRIPTION OF REFERENCE SIGNS

Figure 1:
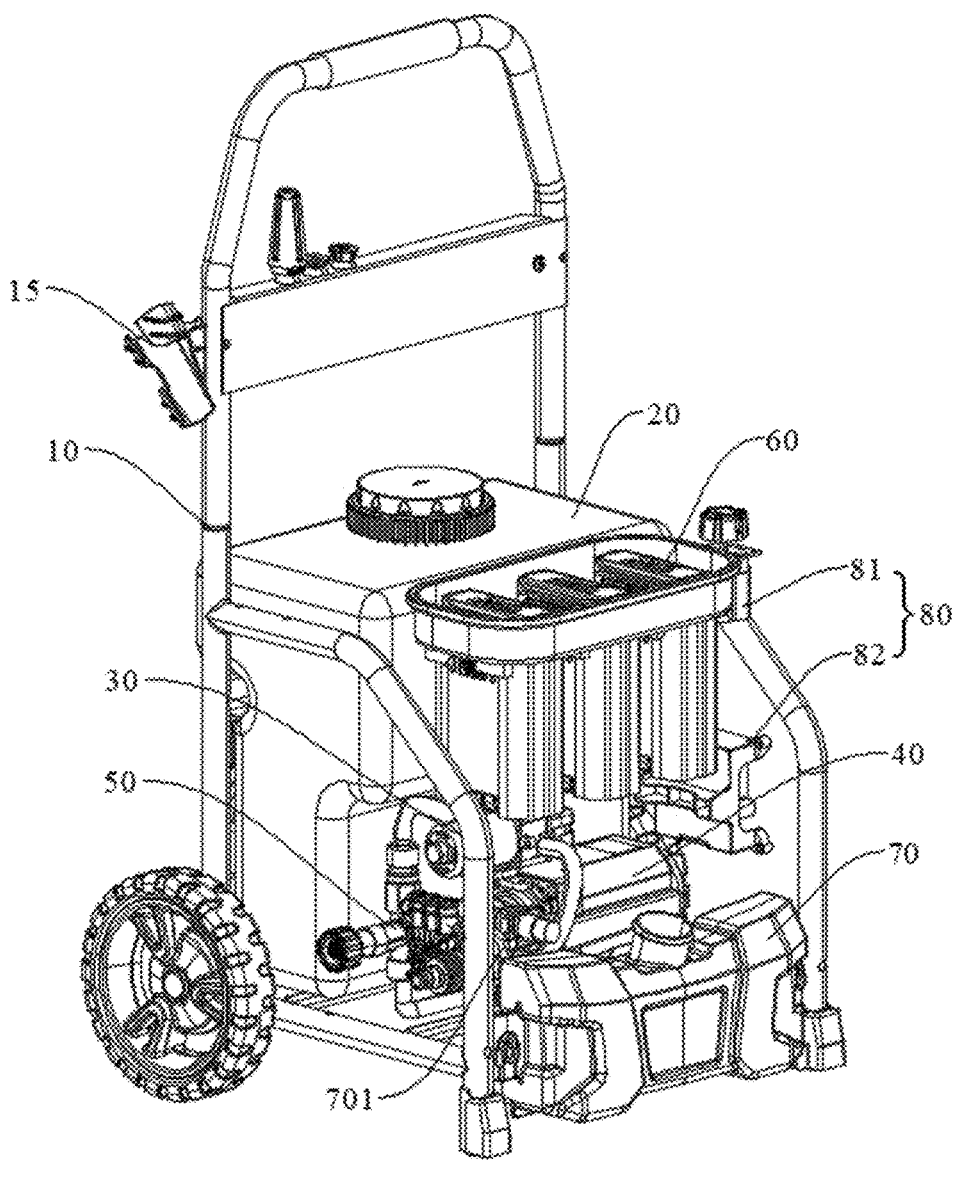
FIG. 1 is a schematic structural diagram of a cleaning device according to an embodiment of the present disclosure.

Frame 10; handle frame 11; supporting frame 12; wheel 13; supporting leg 14; fixed frame 15; winding frame 16; first supporting rod 161; second supporting rod 162; water tank 20; tank body 21; water tank cover 23; water pump 30; water pumping pipeline 301; water pumping joint 302; motor pump assembly 40; motor 41; three-plunger high-pressure pump 42; liquid suction joint 401; multi-channel adapter 50; housing 51; first pipeline 52; first pipeline joint 521; second pipeline 53; first water inlet 501; second water inlet 502; third water inlet 503; tap water joint 5031; first check valve 504; second check valve 505; third check valve 506; exhaust valve 507; water outlet 508; battery pack assembly 60; battery pack mounting box 61; battery pack accommodating cavity 601; battery pack 62; spring 602; terminal insert 603; limiting mechanism 63; mounting base 631; limiting member 632; spring member 633; terminal 631; limiting member 632; spring member 633; terminal interface 621; limiting structure 622; cleaning agent suction pot assembly 70; cleaning agent pipeline 701; alternating current/direct current control module 80; alternating current/direct current power transfer switch 81; controller 82.

DESCRIPTION OF EMBODIMENTS

The following describes some implementations of the present disclosure by using some specific examples. A person skilled in the art can easily understand other advantages and effects of the present disclosure based on the content disclosed in this specification. The present disclosure can be further implemented or applied in some other different specific implementations. Various details in this specification can also be modified or altered based on different viewpoints and applications without departing from the present disclosure.

It should be noted that, the illustrations provided in some embodiments merely describe the basic concept of the present disclosure by using examples. Although the drawings show only components related to the present disclosure, and are not drawn based on a quantity of components, a shape of a component, and a size of a component during actual implementation, a shape, a quantity, and a scale of the components may be arbitrarily changed during actual implementation, and a component layout form may be more complex.

The present disclosure provides a cleaning device, which is suitable for multiple scenarios, such as a case in which a tap water source and an alternating current power source are provided, a case in which an alternating current power source is provided but it is inconvenient to obtain a water source, a case in which a water source is provided but no alternating current power source is provided, a case in which neither a tap water source nor an alternating current power source is provided, and a case in which it is inconvenient to fetch water outdoors. As shown in FIG. 1 to FIG. 9, the cleaning device includes a frame 10, a water tank 20, a water pump 30, a motor pump assembly 40, a multi-channel adapter 50, and a battery pack assembly 60. Specifically, the water tank 20, the water pump 30, the motor pump assembly 40, the multi-channel adapter 50, and the battery pack assembly 60 are all mounted on the frame 10, and the water tank 20 is mounted on a side of the frame 10.

Figure 2:
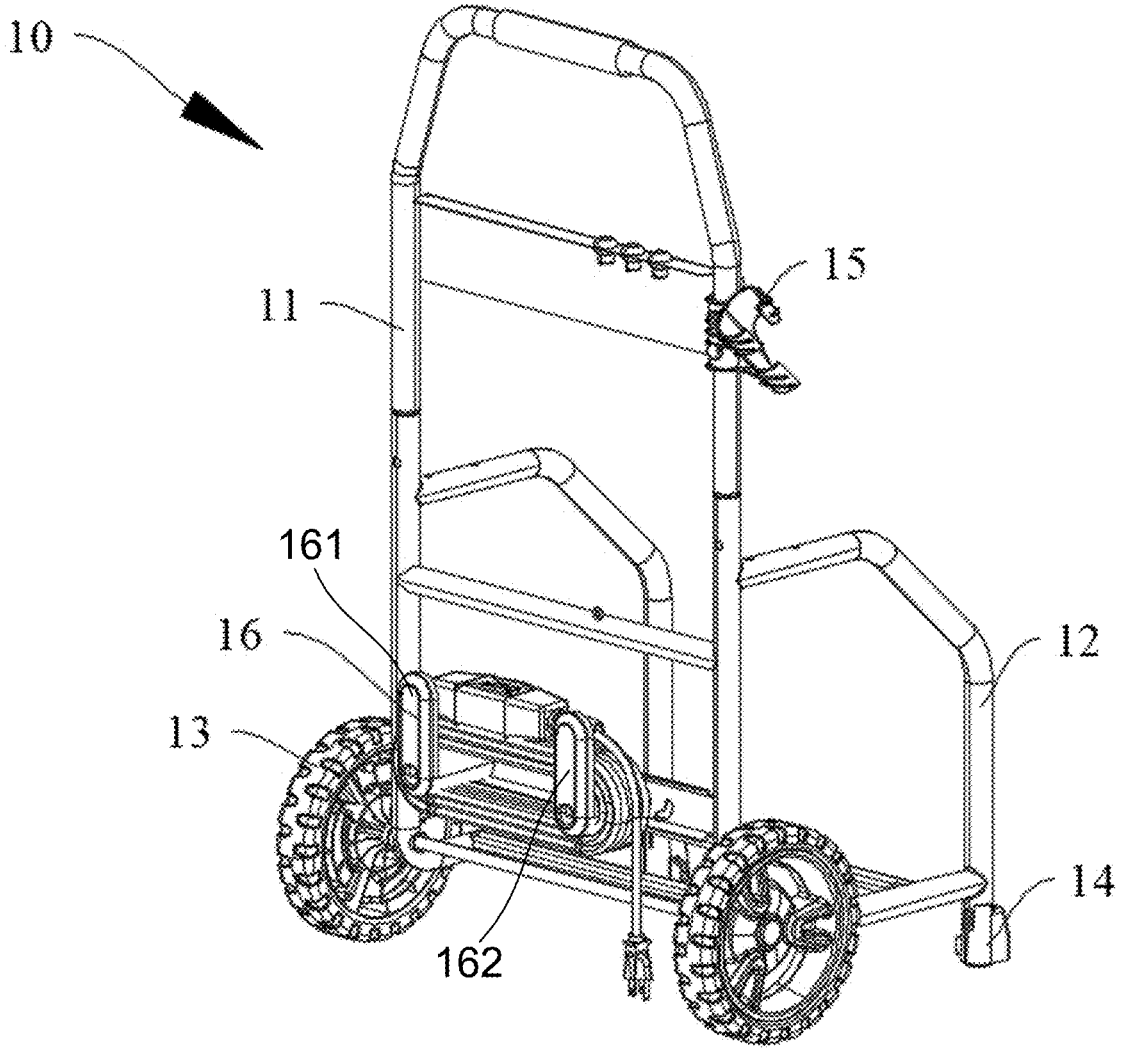
FIG. 2 is a schematic structural diagram of a frame in a cleaning device according to an embodiment of the present disclosure.

Specifically, as shown in FIG. 1 and FIG. 2, in this embodiment, the frame 10 includes a handle frame 11 and a supporting frame 12, where the handle frame 11 is fixedly connected to a side of the supporting frame 12, wheels 13 are mounted at a bottom of the supporting frame 12, the wheels 13 are located on a first side of the supporting frame 12 on which the handle frame 11 is mounted, and supporting legs 14 are mounted on a second side of the supporting frame 12. With the arrangement of the wheels 13, the movement of the cleaning device is facilitated, while with the arrangement of the supporting legs 14, the cleaning device is fixed to a position without moving, so as to avoid affecting the cleaning operation due to movement.

As shown in FIG. 1 and FIG. 2, in this embodiment, since the water tank 20 has a relatively large volume, it is not convenient to remove the water tank for fetching water. Therefore, the water tank 20 is fixed to the frame 10 as a whole, so that the water tank 20 can be easily moved by using the wheels 13 of the cleaning device, and a water filling port of the water tank 20 is relatively large, so that it is convenient to fill the water tank 20 with water or connect an external water pipe to fill the water tank with water. In addition, a fixed frame 15 is further arranged on a side of the handle frame 11, and the fixed frame 15 is configured to place a cleaning tool, such as a cleaning gun, to facilitate operation by a worker. The frame 10 is mainly configured to store, mount, and fix various modules of the cleaning device, and provide protection therefor. In this embodiment, the cleaning device is provided with the water tank 20, the handle frame 11, and the wheels 13, thereby reducing the heavy operation of manually fetching water.

As shown in FIG. 2, in this embodiment, the frame 10 further includes a winding frame 16, and the winding frame 16 is mounted on a side of the supporting frame 12 on which the handle frame 11 is mounted. Specifically, the winding frame 16 includes at least two L-shaped supporting rods spaced apart, which are labeled as a first supporting rod 161 and a second supporting rod 162, respectively. An end of the first supporting rod 161 is fixedly connected to the supporting frame 12, and an end of the second supporting rod 162 is movably connected to the supporting frame 12. The second supporting rod 162 can rotate in a direction from 0° to 90° to facilitate rapid storage and release of a power cable.

Figure 3:
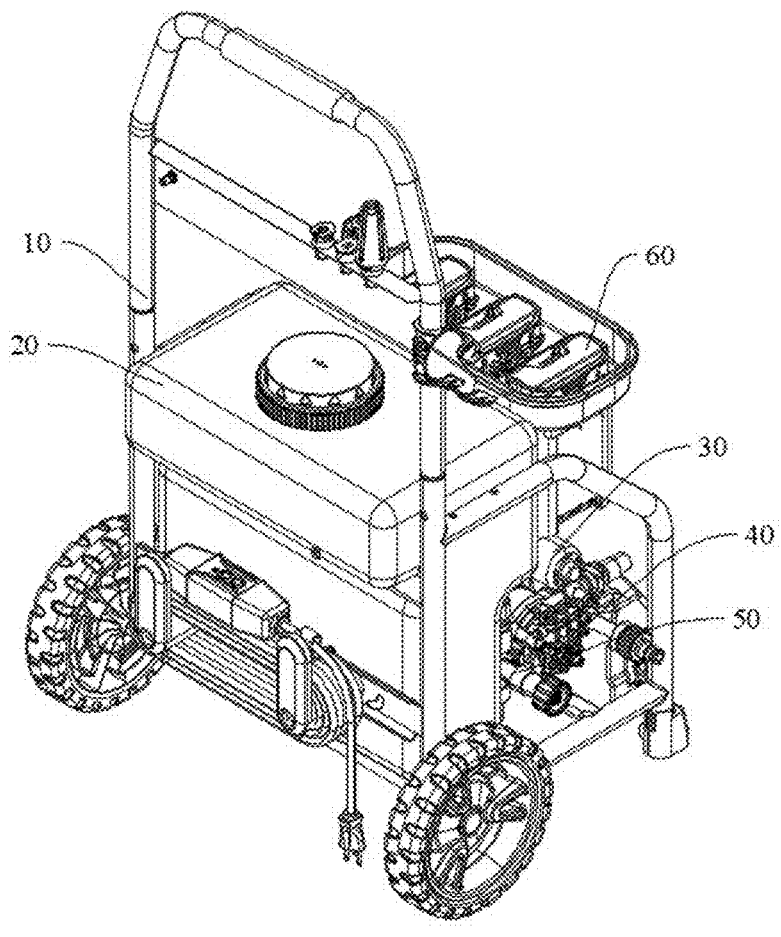
FIG. 3 is a schematic structural diagram of a cleaning device from another angle according to an embodiment of the present disclosure.

As shown in FIG. 2 and FIG. 3, in this embodiment, the water tank 20 is mounted on the supporting frame 12 of the frame 10, and is located on a side close to the handle frame 11. The water tank 20 further includes a tank body 21, a water outlet joint (not shown), a water tank cover 23, and a water filling port. The water filling port is provided at a top of the tank body 21, the water tank cover 23 is mounted on the water filling port, and the water outlet joint is arranged on a side of the tank body 21 and is close to a bottom of the tank body 21. In this embodiment, the water tank 20 has a volume between 15 L and 50 L, and is fixedly connected to the frame 10. A water fetching method may be that water is fetched manually and then poured into the tank body 21 through the water filling port, or an external tap water pipe is connected into the tank body 21 through the water filling port, or water is pumped from an external pool by the water pump 30 provided by the cleaning device and is poured into the tank body 21 through the multi-channel adapter 50 and the water outlet joint. A large water tank 20 is arranged on the cleaning device as a main water source for outdoor use, so that the problem of poor work experience due to a need to frequently fetch water, which is time-consuming and laborious can be solved.

Figure 4:
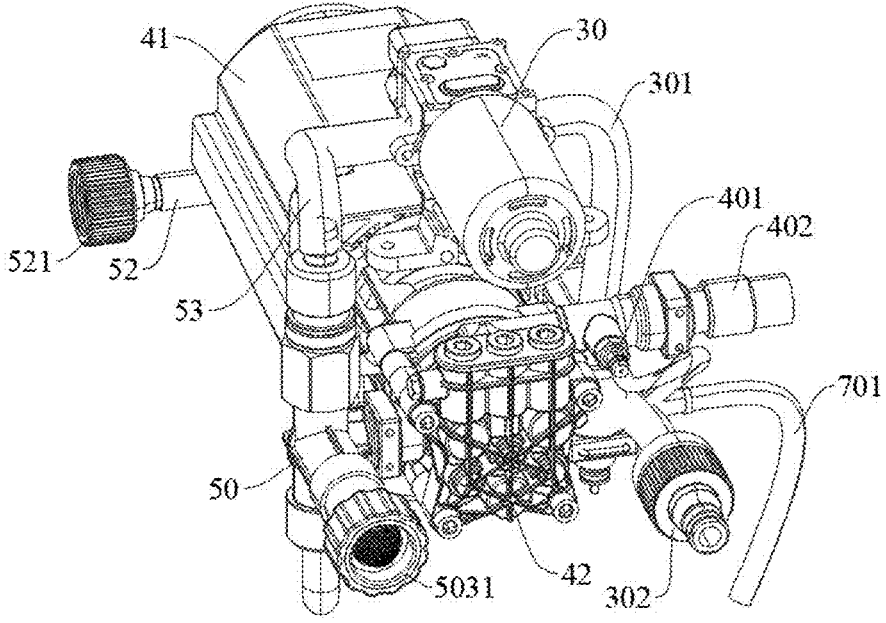
FIG. 4 is a schematic structural diagram of a water supply system in a cleaning device according to an embodiment of the present disclosure.
Figure 5:
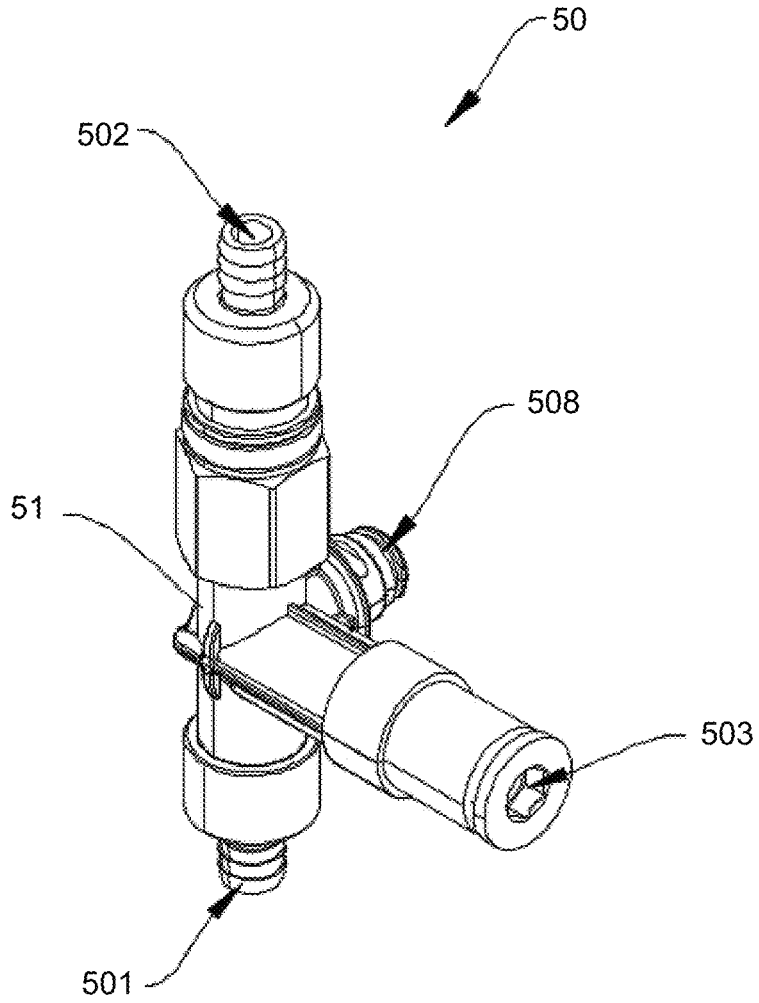
FIG. 5 is a schematic structural diagram of a multi-channel adapter in a cleaning device according to an embodiment of the present disclosure.

As shown in FIG. 4 and FIG. 5, in this embodiment, the multi-channel adapter 50 is also mounted on the frame 10, and interfaces of the multi-channel adapter 50 are configured to connect the water outlet joint (not shown) of the water tank 20, the water pump 30, and the motor pump assembly 40, respectively. In some embodiments, the multi-channel adapter 50 is further configured to connect tap water. Specifically, the multi-channel adapter 50 includes a housing 51, and the housing 51 is provided with a plurality of water inlets and a water outlet 508. The plurality of water inlets are connected to different water sources, respectively, and the water outlet 508 is connected to a water suction port of the motor pump assembly 40. Specifically, the water sources include tap water, water stored in the water tank 20 on the cleaning device, and water from the external pool pumped by the water pump 30.

As shown in FIG. 4 and FIG. 5, in this embodiment, the water inlets include a first water inlet 501, a second water inlet 502, and a third water inlet 503. Specifically, the first water inlet 501 is connected to the water outlet joint of the water tank 20 through a first pipeline 52 and a first pipeline joint 521, so that the water stored in the water tank 20 can be used as a water source to be supplied to the cleaning device. In this embodiment, a first water filtering apparatus is arranged at one end of the first pipeline 52 connected to the water outlet joint of the water tank 20, and the first water filtering apparatus can be disassembled and cleaned, so as to clean out impurities accumulated in the water tank 20, prevent the impurities from entering the motor pump assembly 40, and prevent the motor pump assembly 40 from being damaged.

As shown in FIG. 4 and FIG. 5, the second water inlet 502 is connected to a water outlet of the water pump 30 through a second pipeline 53, and a water pumping pipeline 301 is further connected to a water inlet of the water pump 30. A first end of the water pumping pipeline 301 is connected to the water pump 30, and a water pumping joint 302 is mounted at a second end thereof. A second water filtering apparatus is arranged in the water pumping joint 302 to prevent impurities from entering the water pump 30 and the motor pump assembly 40, and prevent the water pump 30 and the motor pump assembly 40 from being damaged. The water pumping pipeline 301 is configured to be connected in the external pool, so that the water in the external pool can be used as a water source by the cleaning device, to meet use requirements for the cleaning device in various scenarios. In addition, it should be noted that the water pump 30 can directly pump the water from the external pool for use by the cleaning device, and the water in the external pool can be pumped by the water pump 30, and is directly poured, after the second pipeline 53 is manually disconnected from the multi-channel adapter 50, into the water tank 20 through the second pipeline 53 for storage, to facilitate subsequent use. The water pump 30 is configured to pump water in rivers, ponds, and pools into the water tank 20 through the attached water pumping pipeline 301 when it is inconvenient to fetch water from an outdoor water source, so that a user does not need a process of removing the water tank 20 to fetch water from a source, which greatly improves user experience, and can meet use requirements in various scenarios.

As shown in FIG. 4 and FIG. 5, the third water inlet 503 is configured to connect tap water, and the tap water is used as a water source by the cleaning device. The third water inlet 503 is connected to a tap of the tap water through a tap water joint 5031, and a third water filtering apparatus is arranged in the tap water joint 5031 to prevent impurities from entering the motor pump assembly 40 and prevent the motor pump assembly 40 from being damaged.

Figure 6:
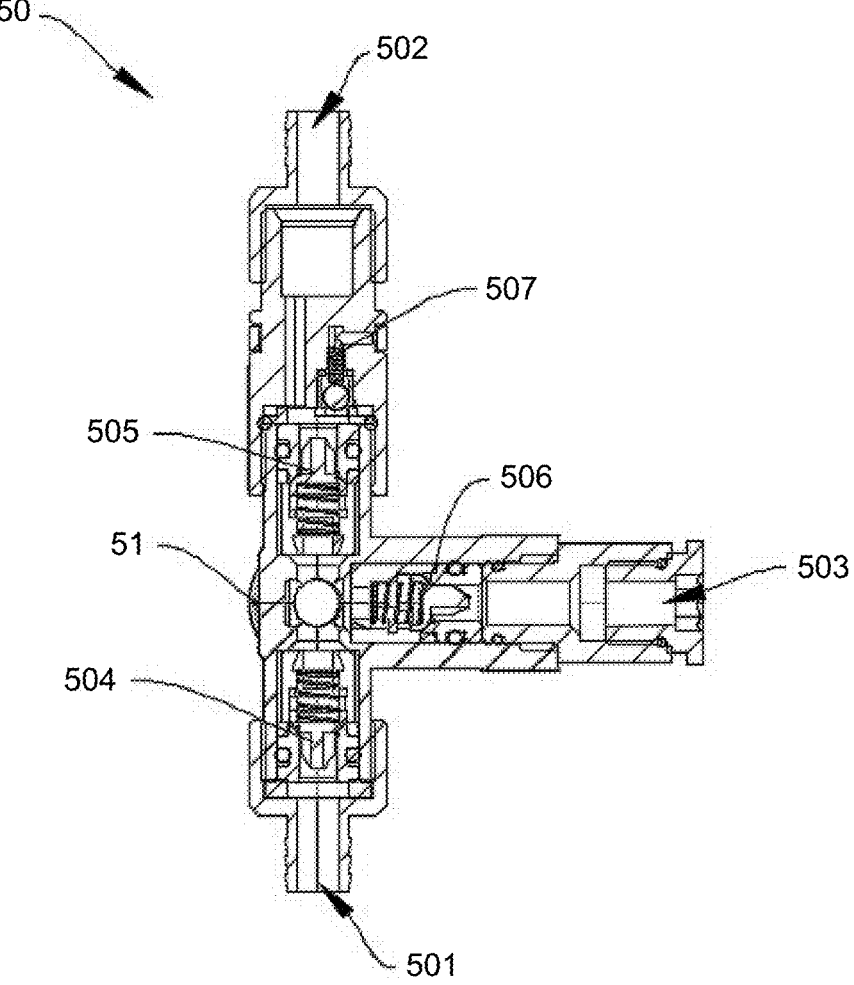
FIG. 6 is a schematic sectional structural view of a multi-channel adapter in a cleaning device according to an embodiment of the present disclosure.

As shown in FIG. 5 and FIG. 6, in this embodiment, one check valve is arranged on each water inlet channel. The valve can only be opened in a unidirectional direction from a water inlet end of a water inlet pipeline to the water inlet pipeline of the pump, that is, one check valve is arranged at each water inlet. Specifically, a first check valve 504 is arranged at the first water inlet 501, a second check valve 505 is arranged at the second water inlet 502, and a third check valve 506 is arranged at the third water inlet 503. Different opening pressure values are set for the first check valve 504, the second check valve 505, and the third check valve 506, so that when a different water source is used, a corresponding check valve is opened, while the remaining check valves are closed, to ensure that when the cleaning device operates by using different water sources, water inflow from different water inlets does not interfere with each other. It should be noted that when the tap water is used as a water source, the third check valve 506 at the third water inlet 503 connected to the tap water is opened, and a larger opening pressure value may be set for the water inlet check valve of this channel due to the larger inlet water pressure; when the water tank 20 is used as a water source and there is almost no inlet water pressure in the channel of the first water inlet 501 connected to the water tank 20, a smaller opening pressure value is set for the water inlet check valve of this channel; and when the external pool is used as a water source, the water pump 30 is connected to the second water inlet 502 through the second pipeline 53, and since a water outlet end of the water pump 30 also has a certain water pressure, the opening pressure value of the check valve on this water inlet channel may be set between the opening pressure values of the check valves at the first water inlet 501 and the third water inlet 503. Moreover, when inlet water from the first water inlet 501, the second water inlet 502, and the third water inlet 503 enters a central chamber of the multi-channel adapter 50, since the check valves on the remaining water inlet channels will be automatically closed under the action of a check valve spring and the inlet water pressure, the inlet water flow will stably supply water to the motor pump assembly.

As shown in FIG. 6, in addition, in some embodiments, an exhaust valve 507 is further mounted in the second water inlet 502 of the multi-channel adapter 50 connected to the water pump 30, that is, two check valves are provided at the second water inlet 502 of the multi-channel adapter 50 connected to the water pump 30, one of the check valves is used for exhaust gas as the exhaust valve 507 and the other is used for water inflow as the second check valve 506. When the exhaust valve 507 does not form a stable water flow, the exhaust valve 507 is in an open state, and the inside of the valve is connected to the outside. When there is gas flow inside, the gas can be quickly discharged from here. When the exhaust is completed, the stable water flow will cause the exhaust valve 507 to be closed, allowing the water to enter the motor pump assembly 40. It should be noted that, the water outlet of the water pump 30 may be connected to the water inlet of the motor pump assembly 40 through a pipeline to directly supply water to the cleaning device. In this case, the exhaust valve 507 can also solve the exhaust problem of a water pipe. An exhaust valve 507 is further designed between the water outlet of the water pump 30 and the water inlet of the multi-channel adapter 50, and the exhaust valve 507 can exhaust the air in a water pumping pipeline. In addition, the water pump 30 forms an initial water pressure during water pumping, so that water in a river or pond can directly enter the high-pressure water pump more quickly.

Specifically, when the water pump 30 is utilized for water supply, during water pumping by the water pump 30, the air originally in the longer water inlet pipeline may pass through the water pump 30 and enter a pipeline between the water pump 30 and the multi-channel adapter 50. As users generally do not exhaust the pump and a water outlet pipeline during use, to prevent the air in the water inlet pipeline from entering the motor pump assembly and then entering the water outlet pipeline to make it take a long time to discharge the air outside a water gun nozzle, particularly, an exhaust valve 507 is arranged at the second water inlet 502 of the pump, so that the air entering this pipeline can be discharged into the atmosphere through the exhaust valve 507. After the air in this pipeline is completely discharged, water flow entering this channel from the water pump 30 may form the inlet water pressure, so that the water inlet check valve of the multi-channel adapter 50 is opened to form a stable inlet water flow. The exhaust valve 507 can also exhaust in time the air in the long water inlet pipeline between the water inlet end of the water pump 30 and the water source, thereby reducing an exhaust time for the motor pump assembly 40 and shortening a high-pressure water outlet time of the motor pump assembly 40. The water pump 30 is preferably a direct current diaphragm pump, and the outlet water pressure of the water pump 30 is 0.3-1.0 MPa, with a flow rate of 3-5 L/min. Since different pressure values are set in the first check valve 504 and the second check valve 505, the second check valve 505 is prevented from being opened by mistake during water inflow from the water tank 20. The flow rate of the water pump 30 is equivalent to the high-pressure water outlet flow rate of the cleaning device, so a stable inlet water flow can be provided to the cleaning device. In addition, when the water pump 30 is supplying water to the water tank 20, it can also ensure that the water flow of the water tank 20 is not interrupted and does not overflow.

As shown in FIG. 4 to FIG. 6, specifically, when the water stored in the water tank 20 is used as a water source, the check valve arranged at the water inlet connected to the water tank 20 on the multi-channel adapter 50 is opened, and the remaining check valves are in a closed state, that is, the first check valve 504 is opened, and the second check valve 505 and the third check valve 506 are closed. When the external pool is used as a water source, the check valve arranged at the water inlet connected to the water pump 30 on the multi-channel adapter 50 is opened, and the remaining check valves are in a closed state, that is, the second check valve 505 is opened, and the first check valve 504 and the third check valve 506 are closed. When the tap water is used as a water source, the check valve arranged at the water inlet connected to the tap water on the multi-channel adapter 50 is opened, and the remaining check valves are in a closed state, that is, the third check valve 506 is opened, and the first check valve 504 and the second check valve 505 are closed.

In some embodiments, the multi-channel adapter 50 may also be provided as a manual three-way valve, and the switching between the above water inlets may also be manually completed by using the manual three-way valve. Specifically, the manual three-way valve includes at least two water inlets and one water outlet, where one of the water inlets is connected to the water tank 20, and the other water inlet is configured to connect the tap water or the water pump 30. The water tank and/or the tap water and/or the water pumped by water pump is used as the water supply source of the cleaning device, and free switching between the two water inlets in the manual three-way valve is achieved through manual switching to switch the water supply source, and the water outlet is connected to the motor pump assembly. One water inlet of the manual three-way valve is connected to a water outlet joint of the water tank through a pipeline, and a first water filtering apparatus is arranged at one end of the pipeline connected to the water outlet joint of the water tank.

Figure 8:
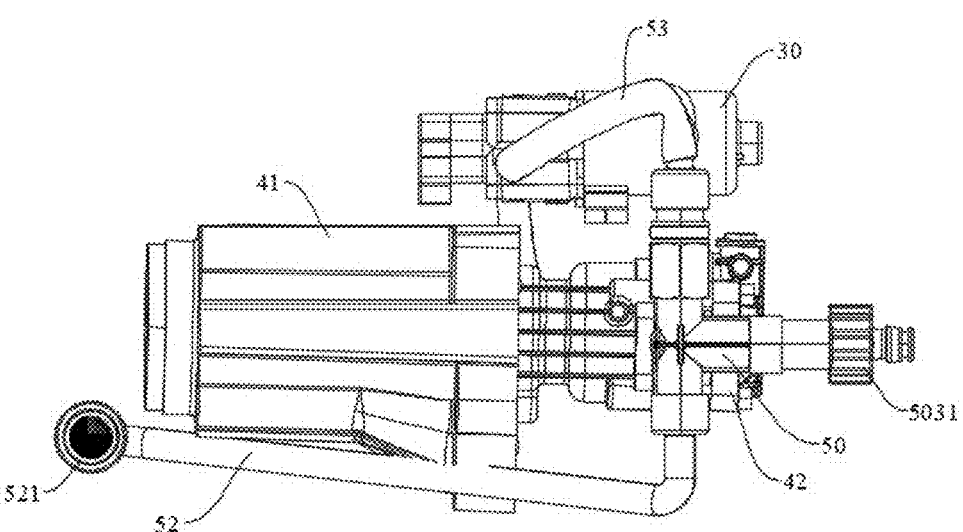
FIG. 8 is a schematic structural diagram of a water supply system in a cleaning device from another angle according to an embodiment of the present disclosure.

As shown in FIG. 1 and FIG. 8, in this embodiment, a motor pump assembly 40 is further mounted on the supporting frame 12 of the frame 10, and the motor pump assembly 40 is a high-pressure water outlet pump. Specifically, the motor pump assembly 40 includes a motor 41 and a three-plunger high-pressure pump 42. The motor 41 is connected to the three-plunger high-pressure pump 42, and a water inlet of the three-plunger high-pressure pump 42 is connected to the water outlet of the multi-channel adapter 50, to pressurize the water in the above water source by the motor pump assembly 40 and then spray the water out from a water spray port 402 of the three-plunger high-pressure pump 42, so as to perform a cleaning operation. In this embodiment, the motor 41 is an alternating current/direct current dual-purpose series-excited motor pump. The alternating current/direct current dual-purpose series-excited motor pump and the multi-pack battery pack assembly 60 constitute an alternating current/direct current dual-purpose cleaning device core and a direct current power source. The cleaning device is fixed in the supporting frame 12 and protected thereby, which solves the power source problem in use by a user in various scenarios. The motor 41 is a series-excited motor, and the motor can operate under the direct current power source and the alternating current power source.

Figure 7:
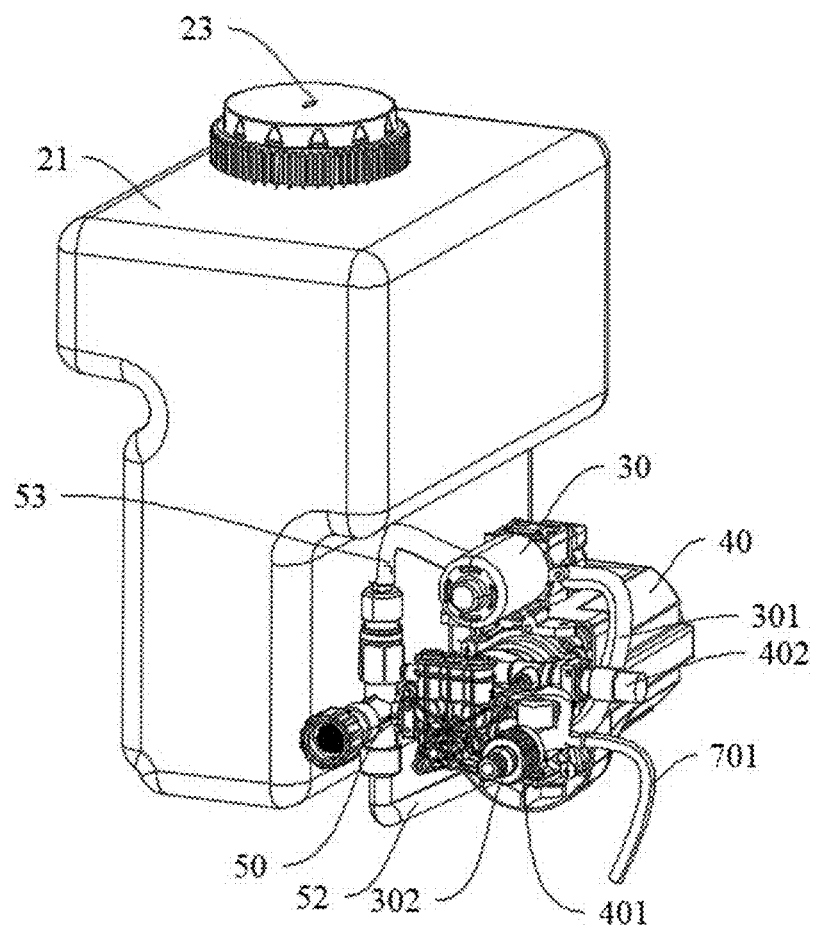
FIG. 7 is a schematic diagram showing assembly of a water tank and a water supply system in a cleaning device according to an embodiment of the present disclosure.

As shown in FIG. 1 and FIG. 7, in some embodiments, a cleaning agent suction pot assembly 70 is further mounted on the supporting frame 12 of the frame 10, the water pump 30 and the motor pump assembly 40 are located between the water tank 20 and the cleaning agent suction pot assembly 70, the cleaning agent suction pot assembly 70 is connected to a liquid suction joint 401 of the motor pump assembly 40 through a cleaning agent pipeline 701, and the liquid suction joint 401 is arranged at the water outlet of the motor pump assembly 40, and is configured to add a cleaning agent into water flow pumped by the motor pump assembly. The cleaning agent suction pot assembly 70 is a cleaning device cleaning agent suction water tank configured by this cleaning device, and a cleaning agent or other liquid for enhancing the cleaning effect is stored therein. The cleaning agent for cleaning is conveyed to the motor pump assembly 40 through the cleaning agent pipeline 701 provided in the motor pump assembly 40 and the cleaning agent suction pot assembly 70, so as to meet requirements of the user for cleaning a dirty environment.

As shown in FIG. 1, in this embodiment, a battery pack assembly 60 is further mounted on the frame 10, and the battery pack assembly 60 is composed of two or more detachable battery packs. The supply voltage is converted into the optimal operating voltage of the motor pump assembly by series and/or parallel connection between the plurality of detachable battery packs, so that direct current power that is the same as alternating current voltage can be provided to the motor pump to ensure that the performance of the cleaning device is equivalent during operation. In addition, at least two battery packs of the battery packs may be connected in series to form one group, and then all groups of battery packs are connected in parallel, so as to convert the supply voltage into the optimal operating voltage of the motor pump assembly 40, to provide the direct current power that is the same as alternating current voltage to the motor pump assembly 40. In addition, the capacity of the direct current power is increased, so that the cleaning device can have a longer battery life in the case of a high voltage. In addition, it should be noted that the battery packs are detachable to facilitate quick and convenient replacement, which further enhances the battery life of the cleaning device.

Figure 9:
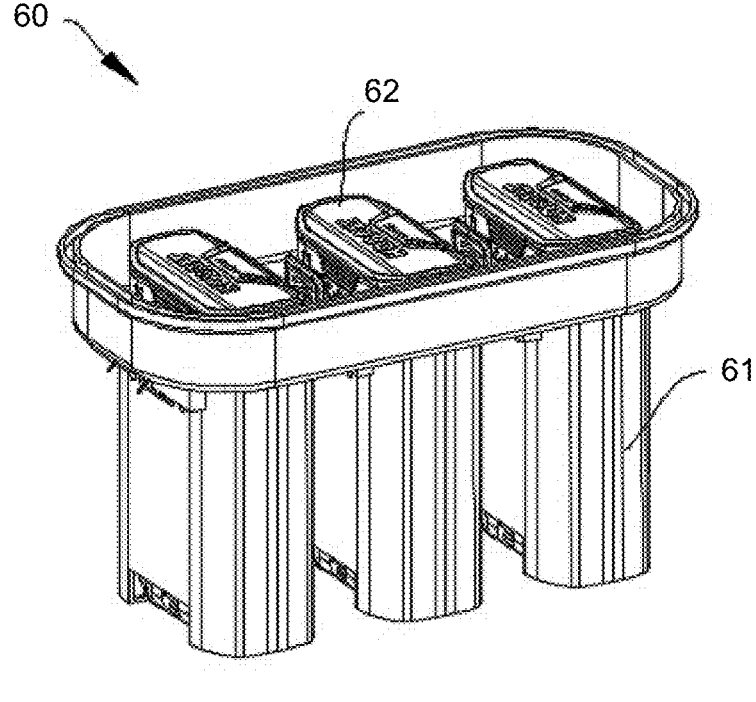
FIG. 9 is a schematic structural diagram of a battery pack assembly in a cleaning device according to an embodiment of the present disclosure.
Figure 10:
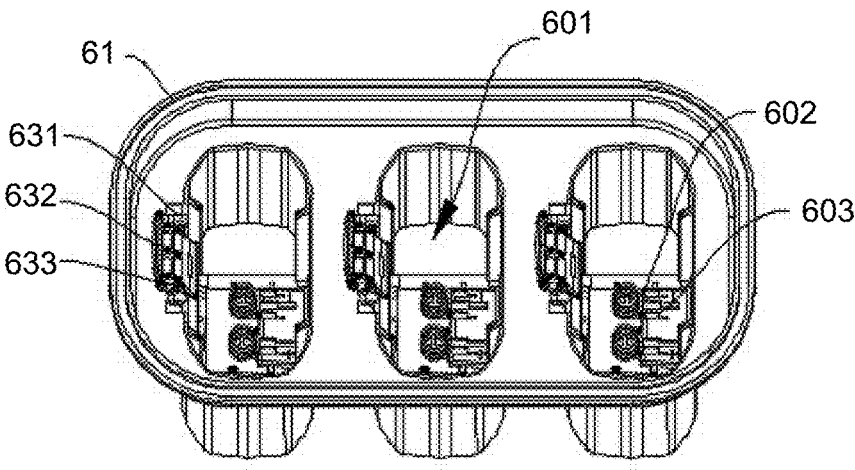
FIG. 10 is a schematic structural diagram of a battery pack mounting box in a battery pack assembly according to an embodiment of the present disclosure.
Figure 11:
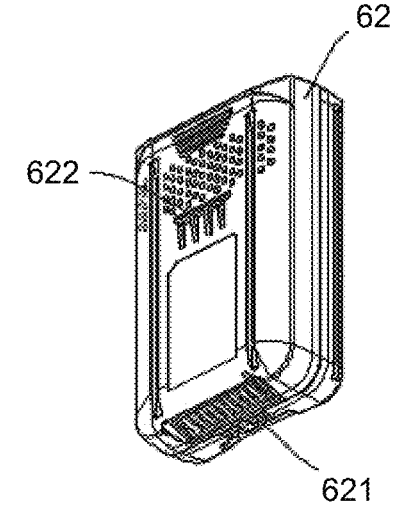
FIG. 11 is a schematic structural diagram of a battery pack in a battery pack assembly according to an embodiment of the present disclosure.
Figure 12:
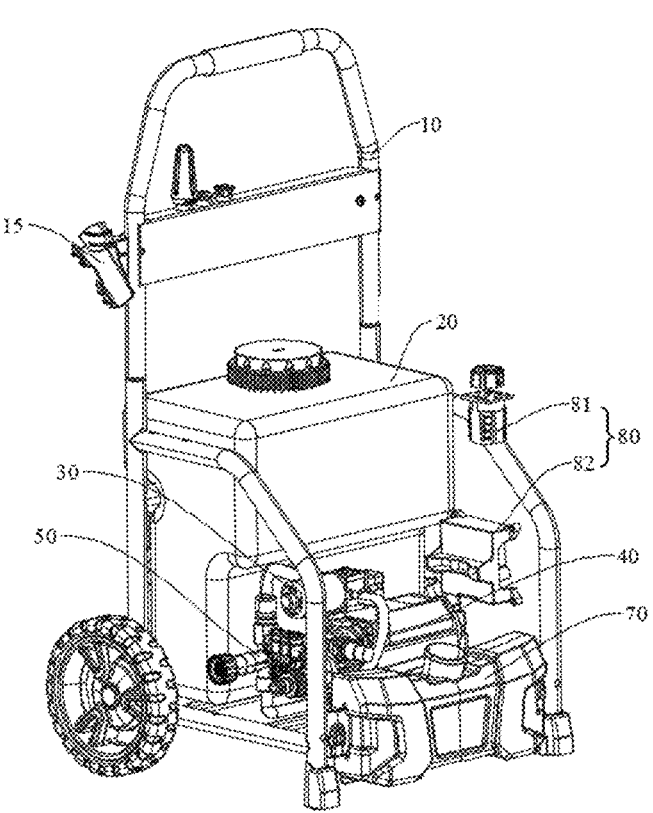
FIG. 12 is a schematic structural diagram of an alternating current/direct current control module mounted in a cleaning device according to an embodiment of the present disclosure.

As shown in FIG. 9 to FIG. 11, specifically, in this embodiment, the battery pack assembly 60 includes a battery pack mounting box 61, and a plurality of battery pack accommodating cavities 601 are provided in the battery pack mounting box 61 to accommodate and mount a plurality of the battery packs 62. In this embodiment, the battery pack accommodating cavities 601 are distributed in a straight line in the battery pack mounting box 61, and certainly, may also be distributed in other ways, such as rectangular distribution and triangular distribution. In this embodiment, the battery pack assembly 60 is mounted on the frame 10 at a position close to the middle to improve the stability of the mechanism.

As shown in FIG. 9 to FIG. 11, in this embodiment, the battery pack mounting box 61 is detachably mounted on the frame 10, and a spring 602 and a terminal insert 603 are mounted at a bottom of the battery pack accommodating cavity 601. The terminal insert 603 is configured to electrically connect a device body not shown when the battery pack assembly 60 supplies power to the device body. In addition, a battery pack limiting mechanism 63 is arranged on a side of a top of the battery pack accommodating cavity 601, and the battery pack limiting mechanism 63 is configured to fix the battery pack 62. Specifically, the battery pack limiting mechanism 63 includes a mounting base 631, a limiting member 632, and a spring member 633, where the mounting base 631 is mounted on a side of the top of the battery pack accommodating cavity 601, or may be integrally formed with the battery pack mounting box 61. The limiting member 632 is rotatably connected to the mounting base 631 by a rotating shaft, and the spring member 633 is sleeved on the rotating shaft, is located between the limiting member 632 and the rotating shaft, and is configured to provide a pressure to the limiting member 632, so that the limiting member limits the battery pack 62 to fix the battery pack 62. Correspondingly, a terminal interface 621 is provided at a bottom of the battery pack 62 to connect the terminal insert 603, so as to provide power to the motor pump assembly 40.

As shown in FIG. 9 to FIG. 11, in addition, a limiting structure 622 matching the limiting member 632 is arranged on a side of the battery pack 62 to fixedly mount the battery pack 62. When the battery pack 62 is mounted, the battery pack 62 is inserted into the battery pack accommodating cavity 601, and the spring 602 is compressed until the terminal insert 603 is inserted into the terminal interface 621, and the battery pack 62 is fixedly mounted under cooperation of the battery pack limiting mechanism 63 and the limiting structure 622. When the battery pack 62 needs to be disassembled or replaced, by pressing the limiting member 632, the limiting member 632 is disengaged from the limiting structure 622, so that the battery pack 62 is not limited. Under an elastic force of the spring 602, the battery pack 62 is ejected to facilitate disassembly or replacement.

As shown in FIG. 9 to FIG. 11, in this embodiment, an electric quantity display portion for displaying a state of charge of the battery pack assembly 60 is arranged on the battery pack assembly 60. In this case, to check the state of charge conveniently, the electric quantity display portion is located in the front of the battery pack assembly 60.

As shown in FIG. 1, in this embodiment, a battery pack group of three 40 V battery packs is shown, and may form a direct current voltage output of 120 V by connecting the three battery packs in series. Similarly, a battery pack group of two 60 V battery packs, two 56 V battery packs, six 20 V battery packs, or the like may form a voltage output of 120 V or close to 120 V. The direct current voltage of 120 V or close to 120 V is equivalent to the alternating current voltage of 120 V in North America and other places, and the cleaning device can achieve almost equivalent power output when operating in alternating current/direct current, so as to achieve an equivalent cleaning effect.

Certainly, a battery pack group of 220 V to 240 V may be formed by three 80 V battery packs, four 60 V battery packs, or the like to be used for the cleaning device. It should be noted that provided that a difference between the direct current voltage and the alternating current voltage is within 20%, the cleaning device with a product power output within 20% may be regarded as having a similar function to this cleaning device.

In addition, a plurality of battery packs may be connected in series and then connected in parallel. For example, two 60 V batteries are connected in series first and then connected in parallel with other two batteries connected in series, so that the electric capacity of direct current can be doubled at the same alternating current voltage, and the working time of the cleaning device can be doubled, thus prolonging the battery life of the cleaning device.

As shown in FIG. 1 and FIG. 9, in addition, the cleaning device is further provided with a power interface, and the power interface is externally connected to a power source by a power cable to provide alternating current power. In this embodiment, the battery pack assembly 60 may provide direct current power to the motor pump assembly 40, or alternating current power may be provided to the motor pump assembly 40 by a power cable on the winding frame 16, and the voltage of the direct current power is equivalent to that of the alternating current power, so that the cleaning device achieves almost equivalent power output when operating in alternating current/direct current, so as to achieve an equivalent cleaning effect. Specifically, the cleaning device can control the switching between the alternating current power and the direct current power by an alternating current/direct current control module 80. The alternating current/direct current control module 80 is mounted on the frame 10, and the alternating current/direct current control module 80 includes an alternating current/direct current power transfer switch 81 and a controller 82; the alternating current/direct current power transfer switch 81 is electrically connected to a battery pack assembly 60 and an external power source, where the battery pack assembly 60 provides direct current power, the external power source provides alternating current power, and the alternating current/direct current power transfer switch 81 is configured to control and switch between the alternating current power and the direct current power; and the controller 82 is configured to protect a circuit, and a supply voltage provided by the battery pack assembly 60 and the external power source by using the controller 82 is consistent with an optimal operating voltage of the motor pump assembly 40. The alternating current/direct current control module 80 may directly connect the alternating current power source by using the alternating current/direct current power transfer switch 81, or integrate a battery pack group connected in series, parallel, or series-parallel into a direct current power source to supply power to the cleaning device. In addition, a line of the direct current power source may also be led out by the battery pack group to supply power to the water pump 30.

Figures 13, 14:
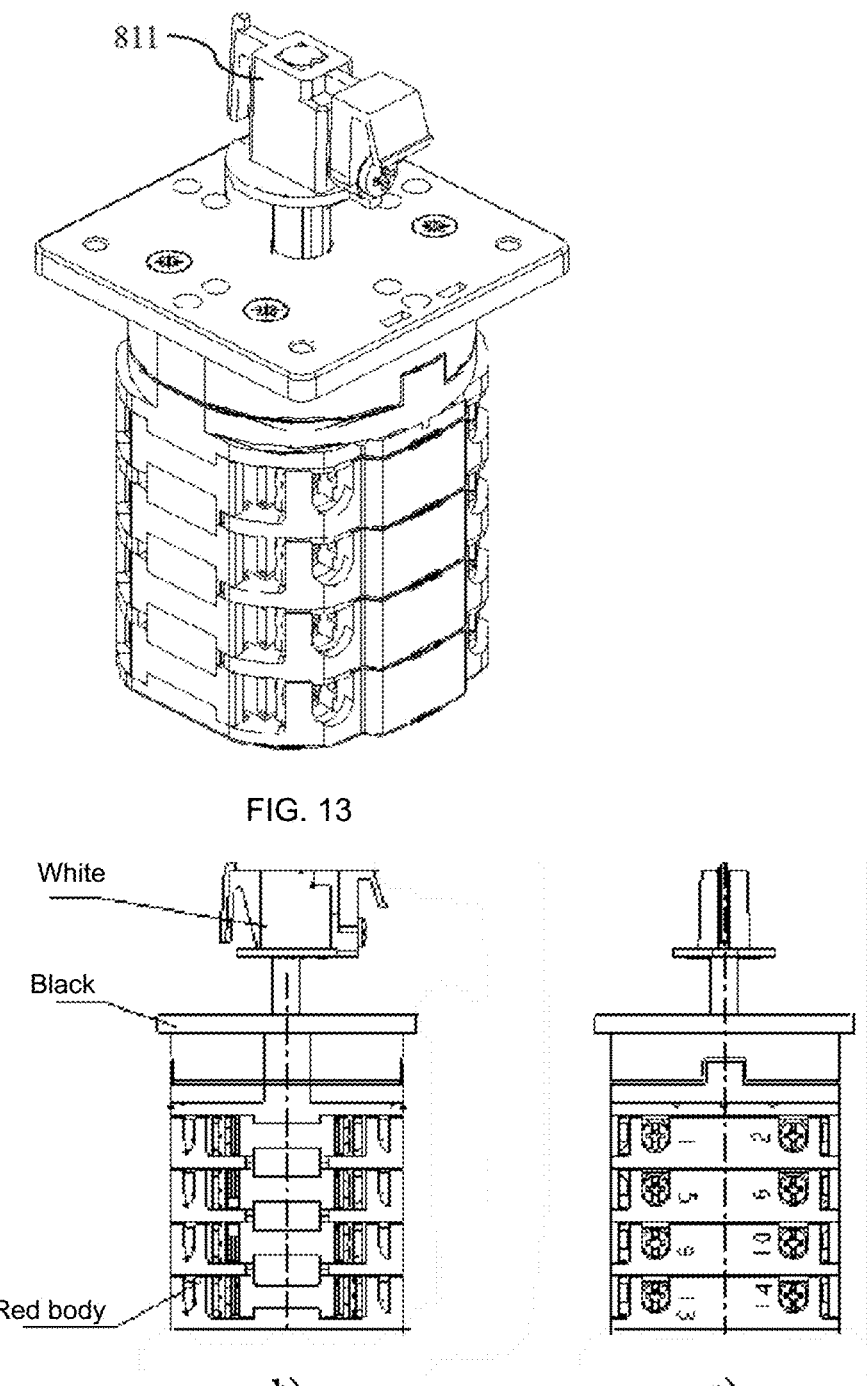
FIG. 13 is an outline view of an alternating current/direct current power transfer switch according to an embodiment of the present disclosure.
FIG. 14 is a sectional view of the alternating current/direct current power transfer switch in FIG. 13 from different angles.
Figure 15:
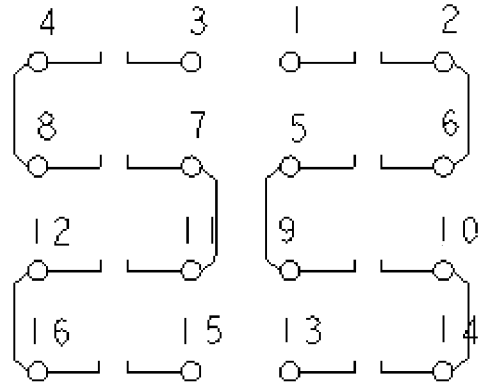
FIG. 15 is a diagram of an electrical principle according to an embodiment of the present disclosure.
Figure 16:
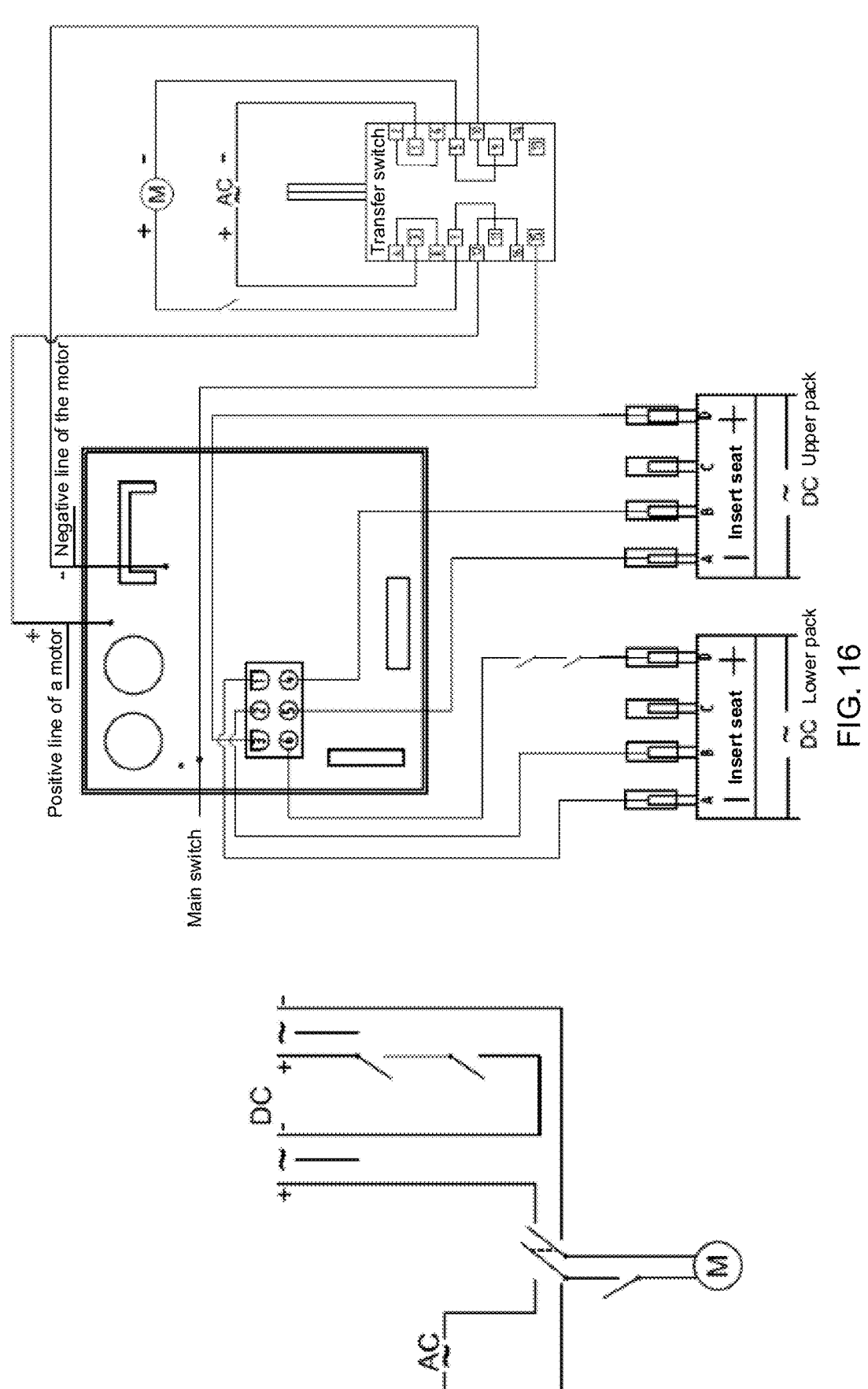
FIG. 16 is a diagram showing wiring between an alternating current/direct current power transfer switch and a controller according to an embodiment of the present disclosure.

Specifically, in this embodiment, the alternating current/direct current power transfer switch 81 is configured to operatively control on-off of a direct current conduction loop and on-off of an alternating current conduction loop. An outline view of the alternating current/direct current power transfer switch is shown in FIG. 13, and FIG. 14 is a sectional view of the alternating current/direct current power transfer switch 81 from different angles. A diagram of an electrical principle of the alternating current/direct current power transfer switch is shown in FIG. 15. The switch is formed by combining multilayer superimposed switches, and a knob joystick 811 is provided in the middle to switch an AC/DC power-on state. FIG. 16 is a diagram showing wiring between the alternating current/direct current power transfer switch 81 and the controller 82. It can be learned from the diagram of a wiring principle, when a knob is operated to connect wiring ends 1 and 3 of the alternating current/direct current power transfer switch 81 to the motor, an external alternating current power source is used to supply power to the motor. When the knob is operated to connect wiring ends 5 and 7 of the alternating current/direct current power transfer switch 81 (ports 5 and 7 are connected to external battery pack ports 10 and 12 by internal wiring of the transfer switch 81) to the motor, the direct current power source of the battery pack group is used to supply power to the motor, so as to realize the switching of alternating current/direct current power supply states.

Figure 17:
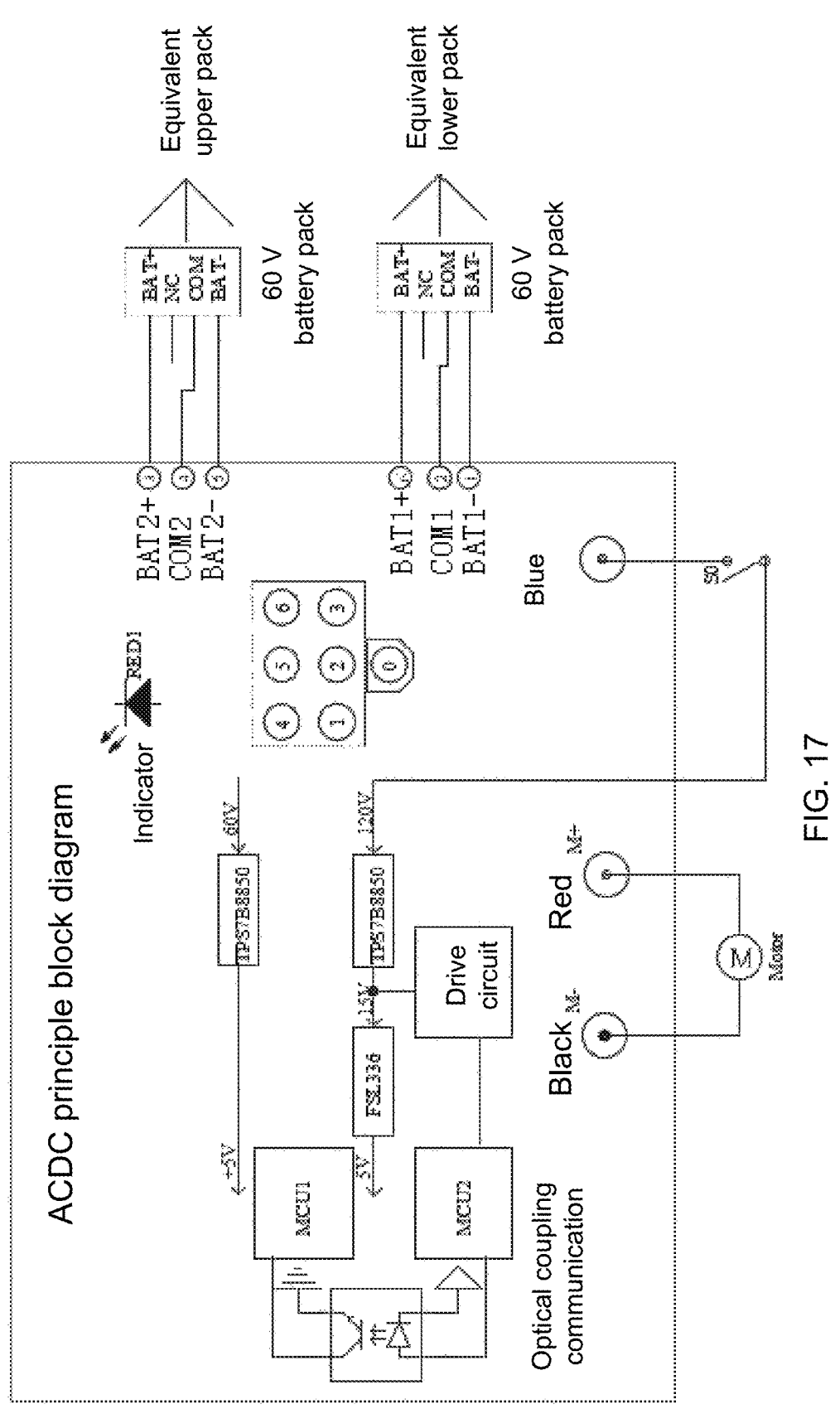
FIG. 17 is a diagram of an electrical principle of a controller according to an embodiment of the present disclosure.

FIG. 16 also shows electrical connection between the battery pack group and the controller, and the figure shows that two battery packs are connected in series to the controller 82. The controller realizes power management and protection of the cleaning device only in the direct current power supply state. A diagram of an electrical principle of the controller is shown in FIG. 17, and the figure embodies a specific principle of controlling a power source.

In conclusion, the present disclosure provides a cleaning device, which can use an alternating current power source and a direct current power source. The alternating current/direct current dual-purpose cleaning device is designed to take into account various use scenarios for the user with or without an alternating current power source, and the cleaning device can operate in the optimal performance state when the alternating current power source supplies power, thereby providing a good cleaning effect. When the direct current power source operates, since the voltage of the battery pack group is equivalent to the alternating current voltage, its use performance is basically equivalent, and ideal results can also be achieved.

The cleaning device according to the present disclosure also takes into account various use scenarios with or without tap water supply for the user, and operating modes of a plurality of inlet water sources and normal switching of various modes are designed, thus greatly improving use convenience for the user.

The present disclosure solves the problems that the cleaning effect is poor because of a low direct current voltage when the user operates in direct current in the past; the electric capacity is small, and the battery life is short. In addition, the present disclosure also solves the problem of how to continue to use water and electricity when it is inconvenient to use tap water, such as outdoors or at a wharf, thereby effectively improving user experience.

The above description is only preferred embodiments of the present application and the explanation of the applied technical principles. It should be understood by a person skilled in the art that the scope involved in the present application is not limited to the technical solutions formed by the specific combination of the above technical features, but should also cover other technical solutions formed by any combination of the above technical features or equivalent features thereof without departing from the inventive concept, such as the technical solutions formed by replacing the above features and (but not limited to) technical features having similar functions disclosed in the present application with each other.

Technical features other than the technical features described in the specification are known to a person skilled in the art, and to highlight the innovative features of the present disclosure, the remaining technical features are not repeated herein.

What is claimed is:
1. A cleaning device, comprising:
    a frame, wherein a water tank, a water pump, and a motor pump assembly are mounted on the frame; and
    a multi-channel adapter provided with a water inlet and a water outlet, wherein the water inlet comprises a first water inlet, a second water inlet, and a third water inlet; a water outlet joint of the water tank is connected to the first water inlet; a water outlet of the water pump is connected to the second water inlet, and a water inlet of the motor pump assembly is connected to the water outlet of the multi-channel adapter;

wherein, a first check valve is arranged at the first water inlet, a second check valve is arranged at the second water inlet, and an opening pressure value of the second check valve is greater than that of the first check valve.

2. The cleaning device according to claim 1, wherein a cleaning agent suction pot assembly is further mounted on the frame, a liquid suction joint is arranged at a water outlet of the motor pump assembly, and the cleaning agent suction pot assembly is connected to the liquid suction joint through a pipeline; and the water pump is located between the water tank and the cleaning agent suction pot assembly.

3. The cleaning device according to claim 1, wherein the first water inlet is connected to the water outlet joint of the water tank through a pipeline, and a first water filtering apparatus is arranged at one end of the pipeline connected to the water outlet joint of the water tank.

4. The cleaning device according to claim 1, wherein a tank body of the water tank is further provided with a water filling port, the water filling port is provided at a top of the tank body, a water tank cover is mounted on the water filling port, and the water outlet joint is arranged on a side of the tank body and is close to a bottom of the tank body.

5. The cleaning device according to claim 1, wherein the motor pump assembly comprises a brushless motor and a three-plunger high-pressure pump, wherein the brushless motor is connected to the three-plunger high-pressure pump, and the water outlet of the multi-channel adapter is connected to a water inlet of the three-plunger high-pressure pump.

6. The cleaning device according to claim 1, wherein the water pump is connected to an external water source through a water inlet pipe, and a second water filtering apparatus is arranged at an end of the water inlet pipe connected to the external water source.

7. The cleaning device according to claim 1, wherein an exhaust valve is further arranged at the second water inlet, and the exhaust valve is arranged between an end of the second water inlet and the second check valve.

8. The cleaning device according to claim 1, wherein a third check valve is arranged at the third water inlet, the third water inlet is connected to tap water, a third water filtering apparatus is arranged at an end of the third water inlet connected to the tap water, and an opening pressure value of the third check valve is greater than that of the second check valve.

9. The cleaning device according to claim 1, wherein the frame comprises a handle frame and a supporting frame, wherein the handle frame is fixedly connected to a side of the supporting frame, wheels are mounted at a bottom of the supporting frame, the wheels are located on a first side of the supporting frame on which the handle frame is mounted, and supporting legs are mounted on a second side of the supporting frame.

10. The cleaning device according to claim 9, wherein the frame further comprises a winding frame, and the winding frame is mounted on a side of the supporting frame on which the handle frame is mounted; a power cable is mounted on the winding frame, and the power cable is configured to connect an external power source to provide alternating current power for the motor pump assembly.

11. The cleaning device according to claim 1, further comprising a plurality of battery packs, wherein the battery packs are detachably connected to the cleaning device.

12. The cleaning device according to claim 1, further comprising:

an alternating current/direct current control module mounted on the frame, wherein the alternating current/direct current control module comprises an alternating current/direct current power transfer switch and a controller;

the alternating current/direct current power transfer switch is electrically connected to a battery pack assembly and an external power source, wherein the battery pack assembly provides direct current power, the external power source provides alternating current power, and the alternating current/direct current power transfer switch is configured to control and switch between the alternating current power and the direct current power; and the controller is configured to keep a supply voltage provided by the battery pack and the external power source being consistent with an optimal operating voltage of the motor pump assembly to physically protect a circuit from an environment, and a supply voltage provided by the battery packs and the external power source by using the controller is consistent with an optimal operating voltage of the motor pump assembly.

13. The cleaning device according to claim 12, wherein a motor in the motor pump assembly is a series-excited motor, and the motor is capable of operating under a direct current power source and an alternating current power source.

14. The cleaning device according to claim 1, further comprising:

a battery pack assembly mounted on the frame, wherein the motor pump assembly is capable of providing direct current power by using the battery pack assembly;

wherein the battery pack assembly comprises at least two detachable battery packs, and a supply voltage of a plurality of detachable battery packs is converted into an optimal operating voltage of the motor pump assembly by series and/or parallel connection between the plurality of the detachable battery packs.

15. The cleaning device according to claim 14, wherein at least two battery packs of the battery packs are further connected in series to form one group, and then all groups of battery packs are connected in parallel, so as to convert the supply voltage into the optimal operating voltage of the motor pump assembly.

16. The cleaning device according to claim 14, further comprising a power interface and an alternating current/direct current control module, wherein the power interface is externally connected to a power source by a power cable to provide alternating current power; and the alternating current/direct current control module is configured to switch between the alternating current power provided by the external power source and the direct current power provided by the battery pack assembly.

17. The cleaning device according to claim 14, wherein the battery pack assembly comprises a battery pack mounting box, and a plurality of battery pack accommodating cavities are provided in the battery pack mounting box to accommodate and mount a plurality of battery packs.

18. The cleaning device according to claim 16, wherein a battery pack limiting mechanism is arranged on a side of a top of the battery pack accommodating cavity; the battery pack limiting mechanism comprises a mounting base, a limiting member, and a spring member, wherein the mounting base is mounted on a side of the top of the battery pack accommodating cavity, the limiting member is rotatably connected to the mounting base by a rotating shaft, and the spring member is sleeved on the rotating shaft and is located between the limiting member and the rotating shaft.

19. The cleaning device according to claim 18, wherein a spring and a terminal insert are mounted at a bottom of the battery pack accommodating cavity; when the battery pack is inserted into the battery pack accommodating cavity, the spring is compressed, the terminal insert is connected to a terminal interface on the battery pack, and the battery pack is fixedly mounted under cooperation of the battery pack limiting mechanism and a limiting structure on the battery pack.

* * * * *